United States Patent [19]

Vetter, deceased et al.

[11] 4,397,411

[45] Aug. 9, 1983

[54] FEEDING CHAIN FOR FEEDING A PACKAGING MATERIAL WEB IN A PACKAGING MACHINE

[76] Inventors: Artur Vetter, deceased, late of Wolfertschwenden, Fed. Rep. of Germany; by Genoveva Vetter, nee Freisinger, heir, Bergstrasse 19, D-8941 Wolfertschwenden, Fed. Rep. of Germany; by Robert Vetter, heir, Bergstrasse 19, D-8941 Wolfertschweden, Fed. Rep. of Germany; by Mona Vetter, heir, Bergstrasse 19, D-8941 Wolfertschweden, Fed. Rep. of Germany

[21] Appl. No.: 271,506

[22] Filed: Jun. 8, 1981

[30] Foreign Application Priority Data

Jun. 12, 1980 [DE] Fed. Rep. of Germany ....... 3022065

[51] Int. Cl.³ ............................................. B65H 17/34
[52] U.S. Cl. ..................................... 226/173; 226/75
[58] Field of Search ............................... 226/170–173, 226/74, 75; 198/626, 627, 850–853

[56] References Cited

U.S. PATENT DOCUMENTS 969,295  9/1910  Meahl ................................. 226/173

Primary Examiner—Leonard D. Christian
Attorney, Agent, or Firm—Donald Brown

[57] ABSTRACT

The packaging machine for producing packages from a packaging material web has a feeding chain for feeding the web. The endless feeding chain is mounted on spaced sprocket wheels and has chain links provided with improved clamping members for clamping the web at one of its lateral edges. The clamping members include on each chain link a first clamping member secured on or integral with the associated chain link, a cooperating second clamping member having a guiding shaft guided in a guiding opening of the first clamping member, a flanged sleeve surrounding the guiding shaft with its flange portion adjacent the first clamping member and a pressure spring engaging between the flange portion and an abutment member mounted on one end of the guiding shaft opposed to the second clamping member.

8 Claims, 5 Drawing Figures

FEEDING CHAIN FOR FEEDING A PACKAGING MATERIAL WEB IN A PACKAGING MACHINE

BACKGROUND OF THE INVENTION

The invention generally relates to the field of packaging machines for producing packages from a packaging material web, more particularly to a feeding chain for use in packaging machines of this kind and comprising improved clamping members for clamping the lateral edges of the packaging material web.

Conventional web feeding chains are formed with first clamping members secured on the chain links and second cooperating clamping members at one end of a guiding shaft guided in a guiding opening of a first clamping member. The guiding shaft is surrounded by a flanged sleeve which has its flange portion adjacent the first clamping member. A pressure spring engages between the flange portion of the sleeve and the bent ends of laterally guided tags which are provided on the clamping member.

The packaging machines equipped with feeding chains of this kind have two spaced sprocket wheels on which the feeding chain is passed. A disc member is associated with one of the sprocket wheels to operate the clamping members at the position where the web should be engaged by the clamping members. To this end, the disc member has a conical lateral face inclined with respect to the rotational axis of the disc. The clamping jaws are opened when they engage the inclined conical face. The clamping jaws are guided by twin lugs and a bottom plane formed thereby and cooperating with the conical engagement surface. This arrangement, however, allows no positive guiding in circumferential direction or perpendicularly to this direction.

OBJECTS OF THE INVENTION

It is a primary object of the invention to provide a feeding chain for use in a packaging machine with improved clamping members and an improved guiding and control arrangement therefor.

A further object of the invention is to provide a feeding chain for use in a packaging machine in which the clamping members have an extremely simple structure.

A further object of the invention is to provide a packaging machine having an improved feeding chain for feeding the packaging material web, the feeding chain having clamping members of extremely simple structure and an improved guiding and control arrangement.

SUMMARY OF THE INVENTION

According to one aspect of the invention, the feeding chain is provided with clamping members mounted on one end of a guiding shaft surrounded by a flanged sleeve. The flange portion of the sleeve is urged towards the cooperating clamping member by a pressure spring engaging between the flange portion and an abutment member mounted on the opposed end of the guiding shaft.

In accordance with another aspect of the invention, a packaging machine for producing packages from a packaging material web is provided which has a feeding chain of the above mentioned kind and which, in addition, is provided with an improved guiding and control arrangement for controlling the clamping operation of the clamping members. This guiding and control arrangement comprises a disc member associated with a sprocket wheel on which the endless feeding chain is passed, and the disc member is adapted to impart the required axial and/or radial movement to the guiding shaft to control their clamping operation. This is achieved by engagement of the rounded guiding shaft ends in appropriate recesses provided on the periphery of the disc member in regularly spaced relationship corresponding to the chain links spacings.

DESCRIPTION OF PREFERRED EMBODIMENTS

Further objects and advantages of the invention will stand out from the following non-limitative description of exemplary embodiments with reference to the drawings. In the drawings.

Figure 1:
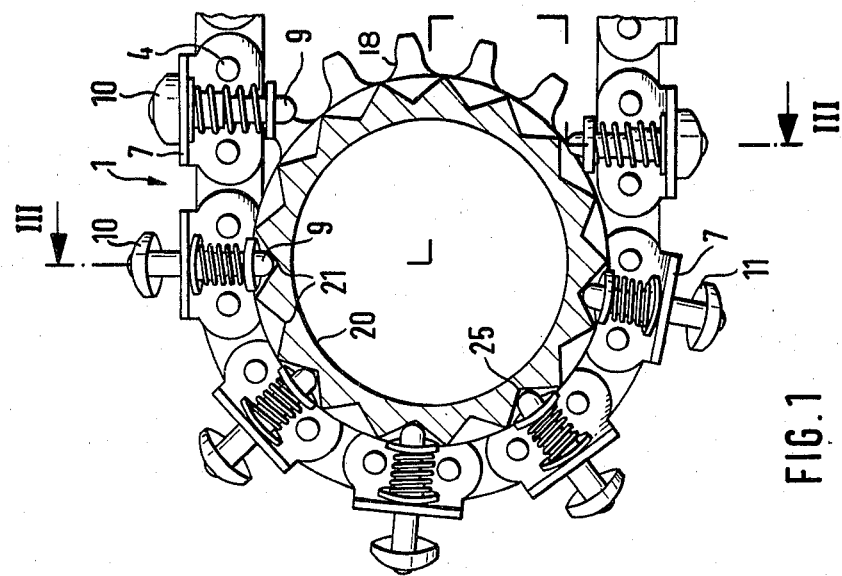
FIG. 1 is a lateral view of a feeding chain passed over an engagement disc, along line I—I in FIG. 3.
Figure 3:
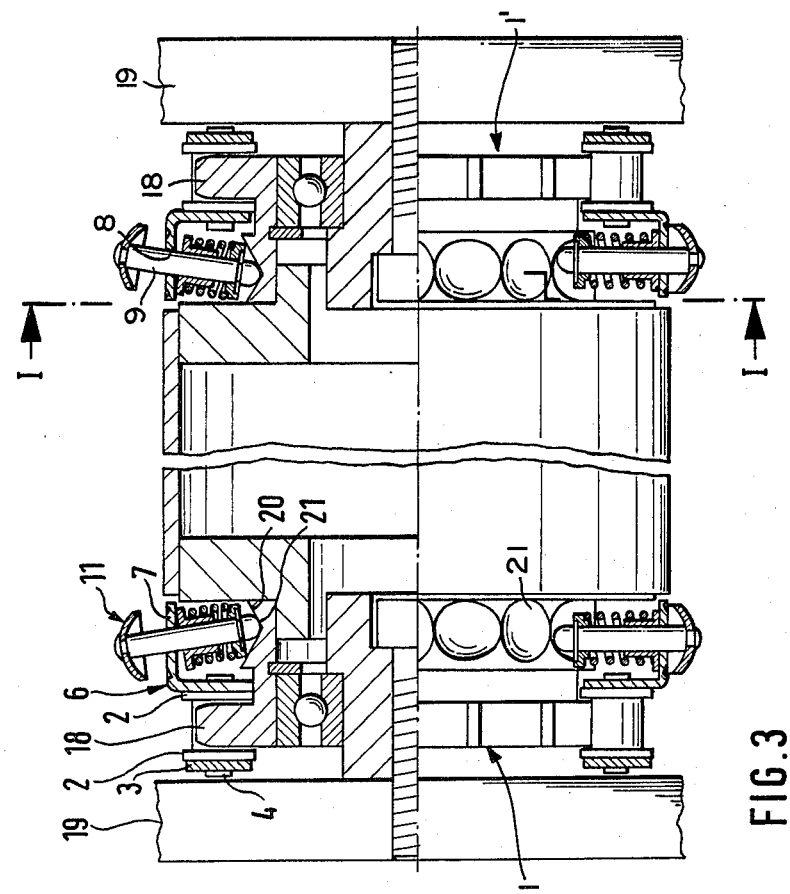
FIG. 3 is a sectional view of a portion of a packaging machine showing sprocket wheels, engagement discs and feeding chains, along line III—III in FIG. 1.

Referring to the drawings, as best seen in FIGS. 1 and 3, the feeding chains 1 and 1' are formed of rollers, inner lugs 2 and outer lugs 3 assembled by pins 4. The outer lugs facing the packaging material web 5 to be fed through the machine is formed as an angled strap 6 having a vertical leg forming the outer lug and a horizontal leg forming the first clamping jaw 7. The first clamping jaw 7 is provided with an opening 8 widening on its two opposed ends in a manner best seen in FIGS. 2 and 4.

A guiding shaft 9 is passed through the opening 8 with a mushroom-shaped or domed head 10 riveted to one of its ends, the head 10 forming the second clamping jaw 11 cooperating with the first clamping jaw 7. Adjacent its opposed end, the shaft 9 has a collar 13 forming an abutment member and secured on the shaft by a retaining ring 12 stopping the movement of the collar 13 towards the end of the shaft. A flange sleeve 14 is provided in sliding relationship on the shaft 9 between the collar 13 and the first clamping jaw 7. A pressure spring 15 engages between the flange portion of the flanged sleeve 14 and the collar 13, the pressure spring having cylindrical shape with an inner diameter slightly exceeding the outer diameter of the flanged sleeve. The pressure spring 15 rests on one of its ends on an abutment 16 formed by one face of the flange portion of the flanged sleeve 14 and, on its other end, on an abutment face 17 formed on the collar 13. The flange of the flanged sleeve 14 has its abutment face perpendicularly with respect to the axis of the shaft 9.

As best seen in FIG. 3, feeding chains 1, 1' are passed over sprocket wheels 18 rotatably mounted within a frame 19 of the packaging machine in conventional manner. In the embodiment shown in FIG. 3, the left hand and right hand sides are formed to be symmetrical. The sprocket wheel 18 is rigidly associated with an engagement disc 20 or integrally formed therewith. The engagement disc 20 extends below the clamping members and is used for opening the clamping members so that the packaging material web 5 may be threaded therebetween and subsequently engaged by the clamping members to be finally released by a reverse opening action of the clamping members. The engagement disc 20 is provided with alignment recesses or bores 21 which may simply be formed as blind bores. The alignment recesses 21 are in registration with the respective center of an adjacent sprocket wheel tooth to lie in a plane defined by the radius of the sprocket wheel extending through the center of the respective sprocket tooth and its rotational axis.

As seen in FIG. 3, the centers of the alignment recesses 21 are laterally spaced from the centers of the guiding openings of the first clamping jaws in a direction towards the material web.

Figure 2:
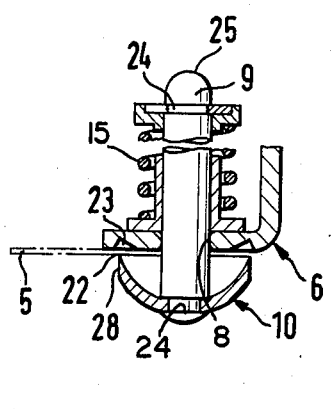
FIG. 2 is a partially sectioned lateral view of a clamping jaw on an enlarged scale.
Figure 4:
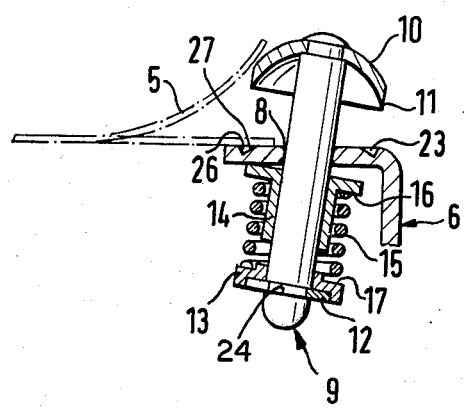
FIG. 4 shows one clamping jaw in opened position for threading the web to be grasped, on an enlarged scale and partially in cross-section.

In operation, the clamping jaws of the feeding chain are initially moved by the pressure springs 15 into the closed position shown in FIGS. 1 and 2. When the endless feeding chain reaches one of the return sprocket wheels 18 (FIG. 1), the respective guiding shaft 9 will engage the associated alignment recess 21 to be moved thereby from the position shown in FIGS. 1 and 3 into the open position shown in FIG. 4, against the action of the pressure spring 15. As the alignment bores 21 are lateraly spaced with respect to the guiding openings 8, the guiding shafts are simultaneously inclined or pivoted to increase the opening gap between the two clamping jaws 7, 11 in the opened position, as compared with a guiding shaft which would not be inclined. The lateral spacing of the alignment recesses 21 with respect to the guiding openings 8 is selected depending on the length of the guiding shaft in a manner to achieve not only a sufficient gap between the two clamping jaws but, additionally, to shift the second clamping jaw 11 laterally away from the material web with respect to the first clamping jaw, as seen in FIG. 4. This will essentially facilitate threading of the material web between the clamping jaws. The threading of the web is further facilitated by an embodiment of the second clamping jaw in which the head portion 10 is mushroom-shaped or domed on its side facing the material web so that the latter may smoothly slide on its upper surface.

When the feeding chain is advanced and the shafts 9 are released from engagement with the engagement disc 20, the pressure spring 15 will urge the guiding shafts into the closed position shown in FIG. 2 on an enlarged scale. The flange of the flanged sleeve 14 allows a perfectly perpendicular alignment of the guiding shaft with respect to the first clamping jaw so that the second clamping jaw formed by the head portion 10 will come into uniform engagement with the first clamping jaw to firmly grasp the lateral edge of the material web.

The engagement of the material web is still improved by an embodiment in which the second clamping jaw 11 having a domed head portion has an edge 22 located exactly below a recess 23 formed as a circular notch cooperating with the edge 22 in the manner of a gearing when the clamping jaws are closed, in the manner best shown in FIG. 2.

On the opposed end of the packaging machine, the material web is released by the guiding shafts being moved back into their opening positions by engagement on the engagement disc.

In the above disclosed embodiment, the head portion 10 is riveted to the guiding shaft. Any other conventional manner of mounting may be used. In accordance with another embodiment, the head portions are integrally formed on the guiding shafts. The collar 13 may be mounted on the guiding shaft using other means than the retainer ring of the preceding embodiment.

From the above disclosure it will be clear that the spacing of the retainer ring 12 or the collar 13 from the end of the guiding shaft 9 cooperating with the alignment recesses 21 is selected depending on the depth of these recesses so that the end of the guiding shafts may pass into the center of the alignment bores.

For holding the retainer ring 12, the guiding shaft 9 may be provided with an appropriate groove 24.

The end 25 of each guiding shaft which will engage into the alignment recesses 21 is rounded and preferably of semi-spherical shape concentrically with respect to the longitudinal axis of the shaft. This will allow an alignment of the shaft in each alignment recess 21, as seen in FIGS. 1 and 3.

Figure 5:
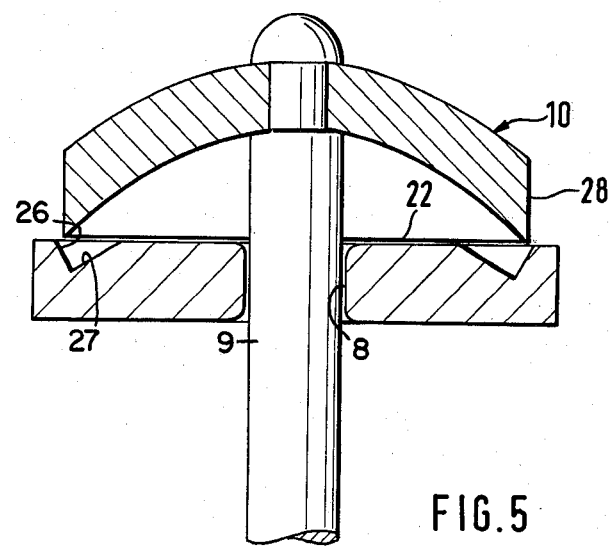
FIG. 5 is an enlarged detailed view of two cooperating clamping members in cross-section.

The notch type recess 23 is provided with a relatively steep lateral wall 26 on the side of the material web and a relatively flat notch wall 27 on the opposed side, as seen in FIGS. 2, 4 and 5. The head portion 10 has the general shape of a spherical hollow dome. The edge 22 of the head portion 10 has a peripheral surface 28 extending substantially parallel to the shaft axis and forming a narrow wedge engaging on the web to grasp the same in cooperation with the notch type recess 23. In accordance with the invention, the diameter of the outer edge 22, of the head portion 10 is selected to be slightly larger than the diameter of the bottom of the notch type recess 23 so that, upon engagement of the edge 22 in the recess 23 without the material web located therebetween, the edge 22 will rest on the outer notch wall 26. When after prolongated use a bead has been formed on the edge 22, this will be positioned in a manner which will not affect firm grasping of the material web or foil.

It should be understood that the above description is in no way limitative and that many modifications and improvements may be brought thereto without departing from the true spirit of the invention.

What is claimed is:

1. A feeding chain for use in a packaging machine for producing packages from a packing material web to be fed through said machine by said feeding chain, said feeding chain comprising articulated chain links, clamping means mounted to the respective chain links, each clamping means comprising cooperable spaced-apart first and second clamping members, said first clamping member being secured to or integral with its associated link and containing an opening, a shaft positioned in the opening, means fixing the second clamping member to one end of the shaft opposite the first clamping member, said shaft being movable in the opening to permit them at times to be engaged and at other times to be disengaged and means for at times yieldably holding the clamping members engaged comprising an abutment at the other end of the shaft, a sleeve positioned about the shaft between the second clamping member and said abutment, a flange at the end of the sleeve adjacent the second clamping member at right angles to the axis of the sleeve and a spring positioned about the sleeve with one end engaged with the flange and the other end engaged with the abutment.

2. The feeding chain of claim 1, wherein said abutment is a collar secured on said shaft.

3. A feeding chain according to claim 1 wherein said second clamping member is in the form of a concavo-/convex head defining a clamping edge facing said first clamping member and a convex surface facing away from said first clamping member.

4. A feeding chain according to claim 1 wherein one of the clamping members defines an edge portion and the other contains a notch positioned to receive the edge when the clamping members are engaged.

5. A feeding chain for use in a packaging machine for producing packages from a packaging material web to be fed through said machine by a chain link feed chain comprising first and second clamping members mounted to each chain link, said first clamping member being secured to or integral with its associated chain link and containing an opening and a groove concentric therewith, a shaft positioned in the opening, said opening being sized such as to enable moving the shaft axially in the opening and tilting the shaft therein, means fixing the second clamping member to one end of the shaft such that by moving the shaft axially in the opening, the clamping members can be moved into and out of engagement with each other and that by tilting the shaft therein, said second clamping member can be inclined relative to the first clamping member, said second clamping member being concavo/convex and positioned on the shaft with its concave side facing the first clamping member and its convex side facing away from said first clamping member and said concave side defining an edge concentric with the groove of a diameter such as to mate with the groove and means for at times yieldably holding the shaft in a position such that the clamping members are in parallel clamping engagement with each other, comprising a collar secured to the opposite end of the shaft, a sleeve positioned on the shaft between the first clamping member and the collar, a flange at the end of the sleeve adjacent the first clamping member at right angles to the axis of the sleeve and a spring positioned about the sleeve under compression with its ends abutting, respectively, the flange and the collar.

6. In a packaging machine for feeding sheet material, an endless feed chain comprised of articulated chain links, spaced sprockets about which the feed chain is entrained for feeding movement of the chain, clamping means mounted to each of the chain links for clamping an edge of sheet material to be fed thereby, each clamping means comprising a first clamping member secured to its associated link, said first clamping member containing an opening, a second clamping member, means supporting the second clamping member for movement relative to the first clamping member comprising a shaft, to one end of which said second clamping member is fixed opposite one side of said first clamping member, a sleeve positioned about the shaft at the other side of the first clamping member, a flange at the end of the sleeve adjacent the first clamping member at right angles to the axis thereof, an abutment on the shaft spaced from the first clamping member, a spring positioned about the sleeve under compression between the flanges and the abutment, said shaft being yieldably movable axially in the opening to effect movement of the clamping members into and out of clamping engagement and tiltable therein to incline the clamping members relative to each other when moved out of clamping engagement to provide an enlarged space between clamping members to facilitate entry of an edge of a sheet to be fed thereby between the clamping members and means in the form of disks associated with the sprockets operable by engagement with the shaft ends to disengage the clamping members and tilt the second clamping member relative to the first clamping member in a direction to enlarge the gap between the clamping members at the side toward the edge of the sheet.

7. The feeding chain of claim 1, wherein said opening is laterally enlarged to allow for limited lateral pivotal movement of said shaft within said opening.

8. A packaging machine according to claim 6 wherein said shaft has symmetrically rounded ends.

* * * * *